Dec. 24, 1963   J. W. McDUFFIE   3,115,088
HAY BALER
Filed Jan. 15, 1963   2 Sheets-Sheet 1
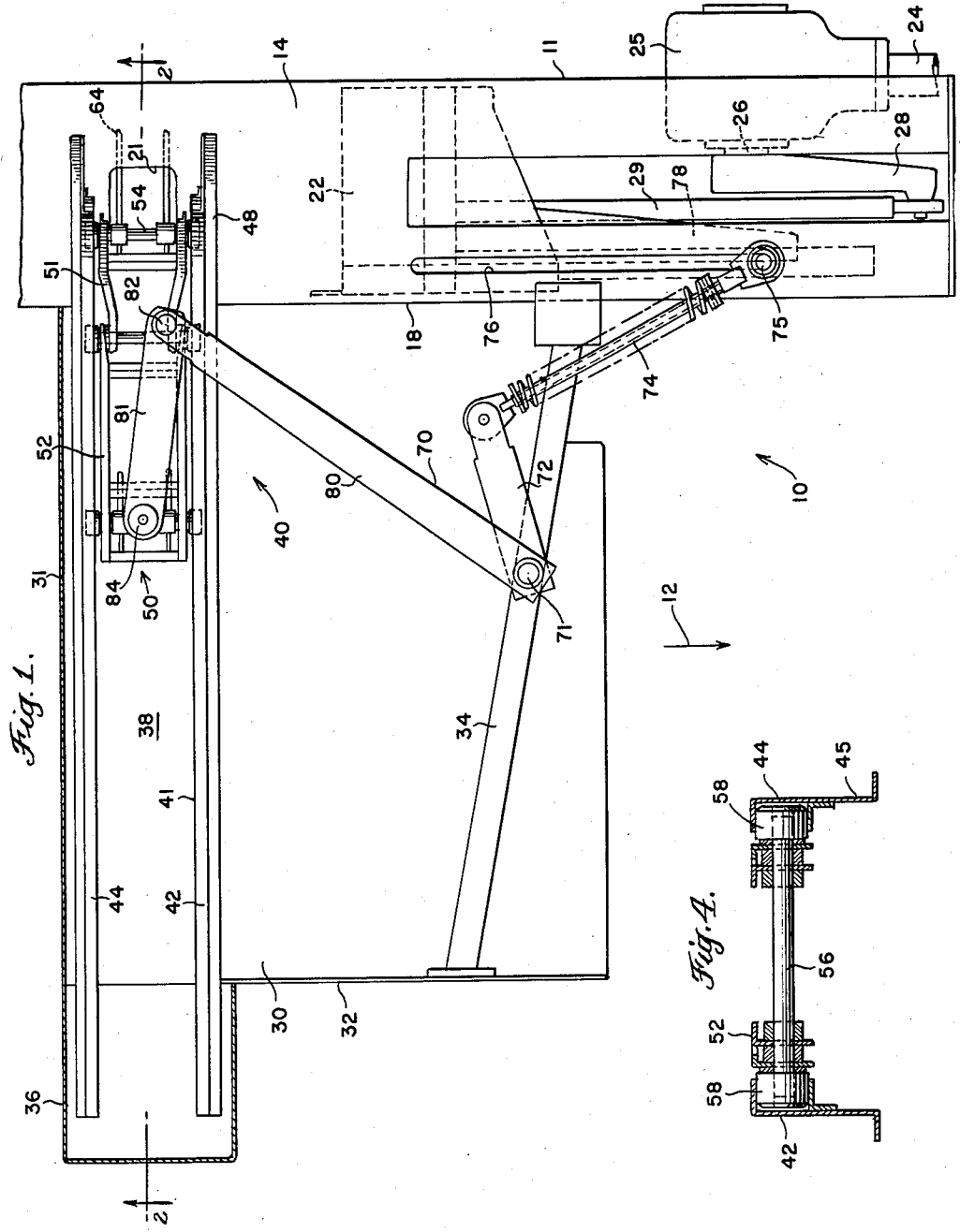
INVENTOR
JAMES W. McDUFFIE
BY Joseph A. Brown
ATTORNEY

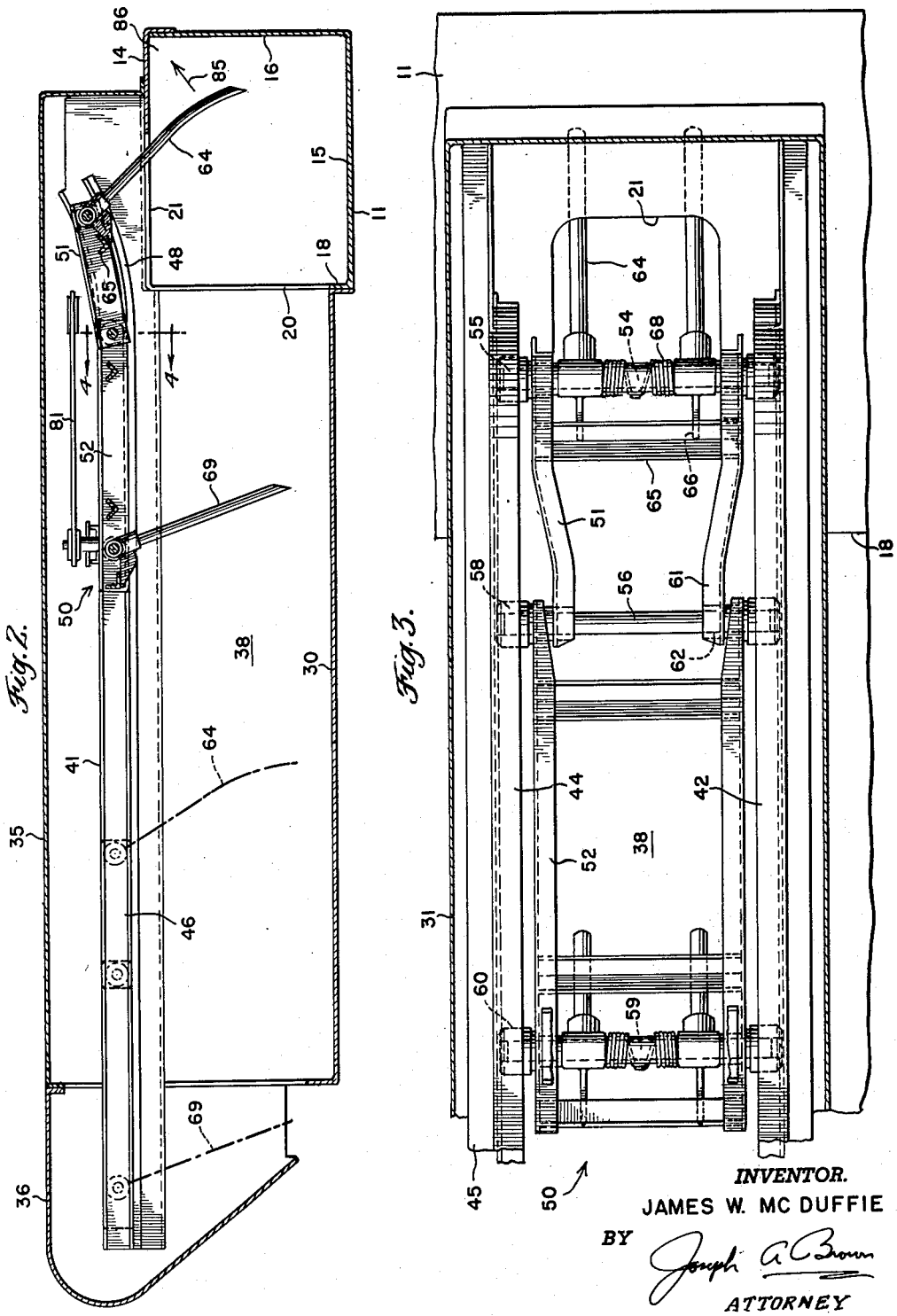

3,115,088
HAY BALER

James W. McDuffie, New Holland, Pa., assignor to Sperry Rand Corporation, New Holland, Pa., a corporation of Delaware
Filed Jan. 15, 1963, Ser. No. 251,521
6 Claims. (Cl. 100—142)

This invention relates generally to hay balers and more particularly to an improved infeed mechanism for a baler.

The bale case of a conventional hay baler is rectangular in cross section and hay is conveyed into the bale case through a side wall opening. To achieve proper bale shape, so important for proper bale handling and stacking, it is important to have a portion of the hay deposited in the bale case directed toward the upper outer corner of the bale case remote from the infeed opening. To achieve this end, various feeder mechanism designs have been provided heretofore such as the structure shown in Nolt et al. U.S. Patent No. 2,950,670.

One object of this invention is to provide a baler feeder of the type which reciprocates rectilinearly toward and away from a bale case to convey crop material through an opening in a side wall of the bale case and having improved means operative on a feeding stroke of the feeder to direct material toward the upper outer corner of the bale case remote from the side wall opening.

Another object of this invention is to provide a baler feeder of the character described having an improved carriage structure including a section operative in a unique manner to vary the travel of hay engageable finger means.

Another object of this invention is to provide a baler feeder having improved operating characteristics over similar feeders of prior design and employing a structure which is simpler.

A further object of this invention is to provide a baler feeder of the character described which, by its simple design, is inexpensive to manufacture, easy to repair and has a long operative life.

Other objects of this invention will be apparent hereinafter from the specification and from the recital in the appended claims.

In the drawings:

FIG. 1 is a generally diagrammatic, fragmentary, plan view of a hay baler having a feeder constructed according to this invention;

FIG. 2 is a transverse vertical section taken on the line 2—2 of FIG. 1 looking in the direction of the arrows;

FIG. 3 is an enlarged fragmentary plan view and part section of the carriage portion of the feeder; and FIG. 4 is an enlarged section taken on the line 4—4 of FIG. 2 looking in the direction of the arrow.

Referring now to the drawings by numerals of reference, 10 denotes a hay baler having a generally horizontal bale case 11 which is elongated in the direction of travel of the baler indicated by the arrow 12. Bale case 11 is rectangular in cross section having a top wall 14, a bottom wall 15, and spaced side walls 16 and 18. Side wall 18 is provided with a feed opening 20 and the top wall 14 is slotted at 21, such slot communicating with opening 20.

Hay or other crop material delivered to the bale case 11 is compressed into bales by a plunger 22 reciprocable in the bale case. A shaft 24 from a suitable source of power, such as the tractor used in towing the baler, is connected to a gearbox 25 having an output shaft 26 to which a crank arm 28 is connected. A connecting rod 29 links crank arm 28 to the plunger 22 whereby when the crank arm is rotated plunger 22 is reciprocated. In FIG. 1, the plunger is shown in a retracted position. When reciprocated the plunger passes opening 22 and top slot 21 in the bale case.

Extending alongside of bale case 11 is a horizontal hay receiving platform 30. Platform 30 is located in a plane adjacent the lower portion of opening 20 as shown best in FIG. 2. On forward travel of the baler, hay is picked up by a conventional pickup mechanism, not shown, and deposited on platform 30. An upstanding back wall 31 is provided to limit rearward travel of the picked material and an outside wall 32 is provided which defines a passage with bale case side wall 18. A transverse brace member 34 interconnects bale case wall 18 and side wall 32, each member being vertically spaced from platform 30 and the crop material passing beneath it. A cover 35 is provided over platform 30 and having a laterally projecting hood 36 remote from the bale case 11.

The rearward portion of platform 30, upstanding wall 31, cover 35 and wall 32 define an infeed chamber 38 alongside bale case 11 and in lateral register with opening 20. For engaging crop material in the chamber and conveying such material into bale case 11 between working strokes of the plunger 22, a feeder mechanism 40 is provided and constructed according to this invention. The feeder comprises a track which extends in a direction transverse to the bale case 11 and to the plunger 12 reciprocable therein. The track has a pair of spaced track members 42 and 44 which extend parallel to each other. As shown best in FIG. 4, the track members are U-shaped in cross section and they open toward each other. Track 41 is carried on support members 45 affixed to side wall 32 and to the top of bale case 11. As shown in FIG. 2, the section 46 of track 41 above platform 30 is straight and parallel to the platform and section 48 of the track above bale case 11 is inclined and curved upwardly. The curvature of section 48 is on a substantial radius whereby the transition from the straight section 46 of the track to the upwardly curved section 48 is gradual.

Supported on track 41 and reciprocable thereover toward and away from the bale case 11 is a carriage 50 having a front section 51 toward bale case 11 and a rear section 52 more remote from the bale case. Front section 51 has a transverse shaft 54 which at its opposite ends projects outwardly of the carriage and carries a pair of bearing members 55 in the form of rollers which project between the sides of track members 42 and 44 to be supported and guided thereby. The front end of the rear section 52 of carriage 50 has a shaft 56 having a pair of bearing rollers 58 slidable on the track members and a rearward shaft 59 having rollers 60 also mounted on the track 41. Front section 51 of the carriage 50 includes frame members 61 pivotally connected at 62 to shaft 56. This connection provides a connection whereby the front section 51 of the carriage is pivotal relative to the rear section 52 and about an axis which is transverse to the extension of track 41.

Shaft 54 of front carriage section 51 pivotally supports feed finger means in the form of a pair of fingers 64 which project downwardly for engagement with hay on platform 30. A stop bracket 65 is provided on the front carriage section and engageable by tabs 66 on the fingers to limit pivotal movement of the fingers in a clockwise direction when viewed as shown in FIG. 2 but permitting the fingers to pivot in an opposite direction. A light spring 68 interconnected between shaft 54 and fingers 64 biases them to pivot in a clockwise direction, FIG. 2. The rearward section 52 of carriage 50 has a pair of feed fingers 69 supported on shaft 59 and operative similarly as the fingers 64. That is, the fingers 69 are limited in pivoting in a clockwise direction, FIG. 2, but may pivot in a counterclockwise direction against a light spring resistance.

Carriage 50 is reciprocated toward and away from bale case 11 by drive means comprising a bell crank 70 pivotally supported at 71 on brace member 34. One arm 72 of the bell crank is connected to plunger 22 by a link arm 74. A pivot pin 75 projects through a slot 76 in the top wall 14 of the bale case and connects the link arm to trailing section 78 of the plunger. The other arm 80 of bell crank 70 is pivotally connected by a link arm 81 to the rear section 52 of carriage 50. A floating pivotal connection is provided between arm 80 and link 81 and a pivotal connection 84 is provided to carriage 50 adjacent shaft 59.

With this drive structure, when plunger 22 is reciprocated, bell crank 70 is oscillated and carriage 50 is reciprocated toward and away from the bale case 11 in precise timed relation with the plunger 22. In FIG. 2, the feed fingers 64 and 69 are shown in solid lines at the end of a working stroke. In dotted lines they are shown in a retracted position. On a working stroke, the fingers operate to sweep hay across platform 30 and into the bale case 11 through the side opening 20. The respective pairs of fingers stand erect on a feeding stroke and lay back on a return stroke. At the end of a feeding stroke, fingers 64 extend downwardly through top slot 21 and beyond the vertical center of the bale case.

When the front portion 51 of carriage 50 is travelling across the straight section 46 of track 41, the feed fingers 64 travels in a straight line. However, when the front section of the carriage reaches the inclined section 48 of the track, the carriage front section is caused to pivot about shaft 56. The front end of the carriage swings upwardly and fingers 64 are caused to sweep in an arc whereby a portion of the hay delivered to the bale case 11 is conveyed in the direction of the arrow 85 in FIG. 2 and toward the upper outer corner 86 of bale case 11 formed by top wall 14 and side wall 16. The very positive conveyance of hay into this corner of the bale case is important in achieving bales which are of uniform density throughout and of a desired square shape. Since the curvature of section 48 of the track 41 is slight, the transition of the front portion of the carriage 51 from the straight section 46 of track 41 to the curved section 48 is gradual whereby stresses and loads are minimized. It will be noted also that the feed fingers 64 remain in fixed pivoted position relative to carriage section 51 during the entire working stroke of the feeder, the swinging of the fingers 64 being derived solely from a pivoting of the carriage section 52.

The feeder described is of simple design whereby it may be manufactured and assembled at low cost. Since shock and stresses are minimized, the components of the feeder will have a long operative life. When repairs are necessary, the task is simple and inexpensive.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains and as fall within the scope of the invention or the limits of the appended claims.

Having thus described my invention, what I claim is:

1. In a hay baler, an elongated generally horizontally extending bale case having a top wall, a bottom wall and a pair of side walls, one of said side walls having a feed opening and said top wall having a slot communicating with said opening, a plunger reciprocable in said bale case and movable across said opening and slot, a hay receiving platform extending laterally from said side wall adjacent a lower portion of said opening, a track mounted above said platform and bale case and extending transverse to the bale case, said track having a straight generally horizontal section above said platform and terminating in an upwardly inclined section over said bale case and angularly disposed relative to the straight section, a carriage, means for moving said carriage over said track toward said bale case and then back over the track away from the bale case in timed relation to said plunger, means connecting said carriage to said track whereby the carriage follows the track, said carriage being coextensive with said track and comprising a frame having a front section toward said bale case and a rear section remote therefrom, means connecting said front section to said rear section for pivotal movement relative thereto about an axis transverse to the extension of said track, hay engageable finger means pivotally supported on said carriage and depending from the carriage front section, said finger means sweeping across said platform, through said side opening and into said bale case between strokes of said plunger to deliver hay to said bale case and when at the end of a feeding stroke the finger means projecting downwardly through said top slot, stop means holding said finger means against pivotal movement relative to said carriage front section and away from said bale case on travel of said carriage toward said bale case and permitting pivotal movement of the finger means toward the bale case and relative to the carriage front section on travel of the carriage away from the bale case, said finger means on moving toward said bale case travelling in a straight line while the front section of the carriage is on the straight section of said track and sweeping upwardly when the carriage front section pivots relative to the rear section on travel of the front section over said track inclined section whereby the finger means directs hay toward the bale case side wall opposite said one side wall and toward the upper portion of the bale case remote from said infeed opening.

2. In a hay baler as recited in claim 1 wherein said means connecting said carriage to said track comprises a first pair of track engageable bearing members connected adjacent the front of said front section, a second pair of bearing members connected to the front of said rear section, and a third pair of bearing members connected to the rear of the rear section.

3. In a hay baler as recited in claim 2 wherein said track comprises a pair of track members U-shaped in cross section and opening toward each other, and said bearing members comprising rollers projecting between sides of the track members.

4. In a hay baler as recited in claim 1 wherein a second hay engageable finger means is provided on said rear section of said carriage, the dimensions of said track being such relative to the length of said carriage that the rear section of carriage travels on said straight section only of said track.

5. In a hay baler as recited in claim 1 wherein said inclined section of said track is curved to facilitate travel of said carriage front section from the straight section of said track to the inclined section.

6. In a hay baler, an elongated generally horizontally extending bale case having a top wall, a bottom wall and a pair of side walls, one of said side walls having a feed opening, a plunger reciprocable in said bale case and movable across said opening, a hay receiving platform extending laterally from said side wall adjacent a lower portion of said opening, a track mounted above said platform and bale case and extending transverse to the bale case, said track having a generally horizontal straight section above said platform and terminating in an upwardly inclined section adjacent said bale case and angularly disposed relative to the straight section, a carriage mounted on and connected to said track, means for moving said carriage over said track toward said bale case and then back over the track away from the bale case in timed relation to said plunger, said carriage being coextensive with said track and comprising a frame having a front section toward said bale case and a rear section more remote therefrom, means connecting said front section to said rear section for pivotal movement relative thereto about an axis transverse to the extension of said track, hay engageable finger means supported on said carriage and depending from the carriage front section, said finger means sweeping across said platform, through said side opening and into said bale case between strokes of said plunger, said front carriage section on moving toward said bale case travelling in a straight line while on the straight section of said track and travelling upwardly on movement over said track inclined section whereby the front section is pivoted relative to the rear section and the finger means directs hay toward the bale case side wall opposite said one side wall and toward the upper portion of the bale case remote from said infeed opening.

References Cited in the file of this patent

UNITED STATES PATENTS

| | | |
|---|---|---|
| 2,572,180 | Morrison | Oct. 23, 1951 |
| 2,884,850 | Nolt | May 5, 1959 |
| 2,950,670 | Nolt et al. | Aug. 30, 1960 |

FOREIGN PATENTS

| | | |
|---|---|---|
| 196,708 | Austria | Mar. 25, 1958 |